United States Patent [19]
Lee et al.

[11] Patent Number: 6,074,463
[45] Date of Patent: Jun. 13, 2000

[54] FAN FILTER UNIT HAVING A MONITORING DEVICE FOR USE IN A SEMICONDUCTOR DEVICE MANUFACTURING CLEAN ROOM

[75] Inventors: Joung-sun Lee, Suwon; Ki-whan Lim, Yongin, both of Rep. of Korea

[73] Assignee: Samsung Electronics Co., Ltd., Suwon, Rep. of Korea

[21] Appl. No.: 09/003,523

[22] Filed: Jan. 6, 1998

[30] Foreign Application Priority Data

Jan. 9, 1997 [KR] Rep. of Korea ............ 97-383

[51] Int. Cl.[7] ................................ B01D 35/143
[52] U.S. Cl. .................. 96/417; 55/385.2; 55/471; 55/DIG. 34; 116/DIG. 25
[58] Field of Search .............. 55/385.2, 467, 55/471, 473, 484, DIG. 34; 96/417, 418, 422, 421, 414, FOR 170; 454/187; 116/268, 266, 270, DIG. 25

[56] References Cited

U.S. PATENT DOCUMENTS

| | | | |
|---|---|---|---|
| 2,655,894 | 10/1953 | Rabbitt | 55/417 |
| 3,522,724 | 8/1970 | Knab | 55/417 |
| 3,639,998 | 2/1972 | Mason | 55/417 |
| 4,610,703 | 9/1986 | Kowalczyk | 55/417 |

*Primary Examiner*—David A. Simmons
*Assistant Examiner*—Robert A. Hopkins
*Attorney, Agent, or Firm*—Jones Volentine, L.L.P.

[57] ABSTRACT

A fan filter unit has a blower, a motor, a filter and a charge induction sensor installed on the ceiling of a clean room. The charge induction sensor is movable between a drive stopped position at which the sensor can be seen with the naked eye and a normal drive position at which the sensor can not be discriminated from the bottom of the filter. The direction of air passing through the filter and static charges prevailing in the unit dictate the position assumed by the sensor.

13 Claims, 3 Drawing Sheets

FAN FILTER UNIT HAVING A MONITORING DEVICE FOR USE IN A SEMICONDUCTOR DEVICE MANUFACTURING CLEAN ROOM

BACKGROUND OF THE INVENTION

1. Field of the Invention

The present invention relates to a fan filter unit of a semiconductor device manufacturing clean room, and more particularly, to a fan filter unit having a monitoring device which allows the operating state of the fan filter unit to be determined with the naked eye.

2. Discussion of the Related Art

Industrial hygiene greatly influences the quality and yield in manufacturing semiconductor devices. The processes of manufacturing semiconductor devices are therefore carried out in clean rooms of high purity. In the clean room, contaminants, such as dust, are eliminated by an air stream. The air stream ideally creates a downwardly directed laminar flow with minimal drift or vortices.

FIG. 1 illustrates a simple structure of the interior of the clean room. A production line 1 is provided with manufacturing equipment 2. Multiple fan filter units 3 are installed on the ceiling and a grating 4 is installed at the bottom of the production line 1. The air forced through fan filter units 3 is supplied to the production line 1 and flows downward. Foreign substances generated in production line 1 are exhausted through the grating 4 by the downward flow, thereby maintaining the inside of production line 1 at a high purity state. The air exhausted through grating 4 flows back over the ceiling and is recirculated by fan filter unit 3, thereby creating a high purity clean room.

FIG. 2 illustrates a fan filter unit for maintaining the high purity state of the clean room according to the prior art. The conventional fan filter unit 3 consists of a blower 11, motor 12, and filter 13 for eliminating contaminants, such as dust, from the air. Motor 12 is exclusively controlled by a local control unit 14 containing a microprocessor.

Depending upon the size of the clean room, hundreds to thousands of fan filter units may be installed, each having such a structure. Since each fan filter unit contains individual motors 12, the rate at which the drive motors stop due to a malfunction increases as time passes, or they may reach their service life expiration and require replacement. Since the internal pressure will exceed the external pressure when the motor of the fan filter unit stops in the clean room, the air in the clean room begins to flow backwards, resulting in an increase in the amount of particulate accumulated in the clean room, contrary to the basic concept of maintaining the clean room free of such contaminants. Consequently, products manufactured near the area described above are contaminated, thereby decreasing their quality and hence, the yield of satisfactory products.

According to a survey of such clean rooms which have operated for 4 to 6 years, 15 to 25% of the fan filter units stop because of some malfunction or other reason. The seriousness of such conditions cannot be easily detected using the present monitoring system. In order to determine the condition of the fan filter units, every fan filter unit must be checked individually using directional transistors, supersonic waves, or a three-dimensional wind velocity measuring instrument. An operator must check the velocities of the air streams flowing through the fan filter units to determine their operating states, which is a time-consuming process. Problems occurring after an inspection cannot be identified until the next inspection. Thus, the affected area is left at a low purity state making the clean room inefficient.

SUMMARY OF THE INVENTION

Accordingly, the present invention is directed to a fan filter unit monitoring device which substantially overcomes the limitations and disadvantages of the related art.

More specifically, an object of the present invention is to provide a fan filter unit monitoring device which allows an operator to visually monitor the operating state of the fan filter units. This in turn allows an abnormal operation to be determined quickly, thereby facilitating maintenance and management of the clean room as well as decreasing operating losses resulting from the production of contaminated products.

To achieve these and other objects and advantages, the present invention provides a fan filter unit having a blower, a motor, a filter for purifying air, and a fan filter unit monitoring device comprising a charge induction sensor located at the bottom of the filter. The charge induction sensor is movable between a drive stopped position at which the sensor can be seen with the naked eye, and a normal drive position at which the sensor can not be discriminated from the filter. This movement is carried out by air passing through the filter and creating static electricity caused by friction generated between the sensor and the air flow. The charge induction sensor consists of a plate which is made of a positively charged material and extends vertically from the bottom of the filter, and a flag which is made of a negatively charged material and is attached to both sides of the top end of the vertical plate. Whether the flag sticks to the filter or to the vertical plate is determined by the direction of the air stream and the prevailing charges of static electricity.

BRIEF DESCRIPTION OF THE DRAWINGS

These and other objects, features and advantages of the present invention will described with reference to the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Figure 1:
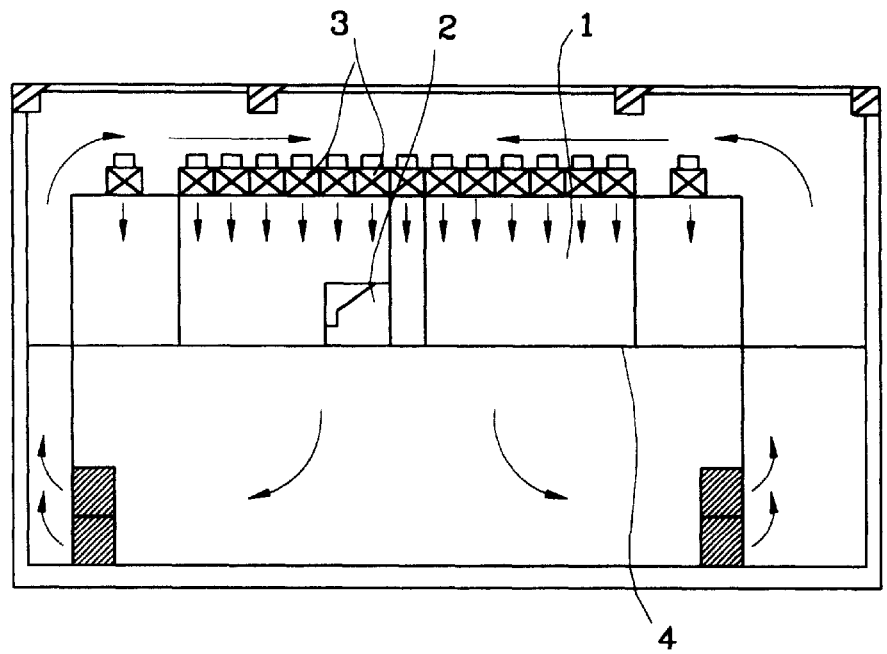
FIG. 1 is a schematic diagram of the interior configuration of a conventional clean room.
Figure 2:
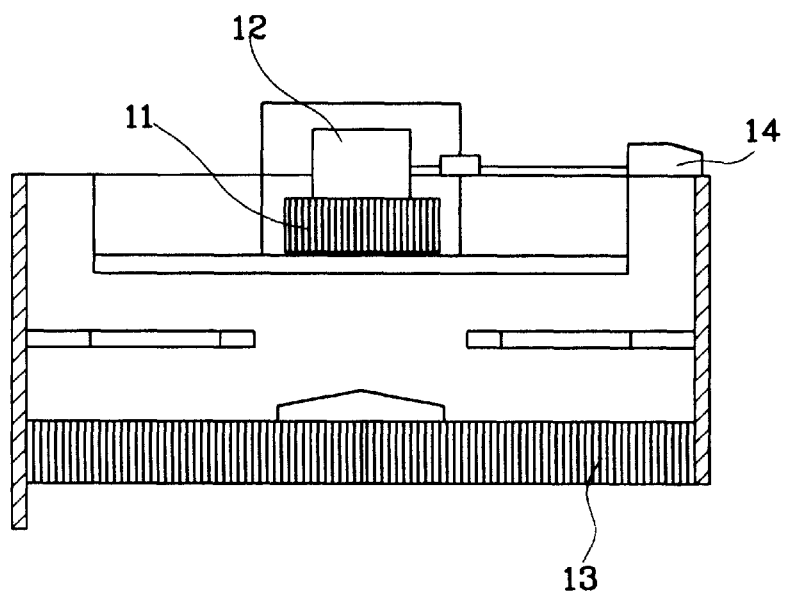
FIG. 2 is a sectional view of a conventional fan filter unit.
Figure 3:
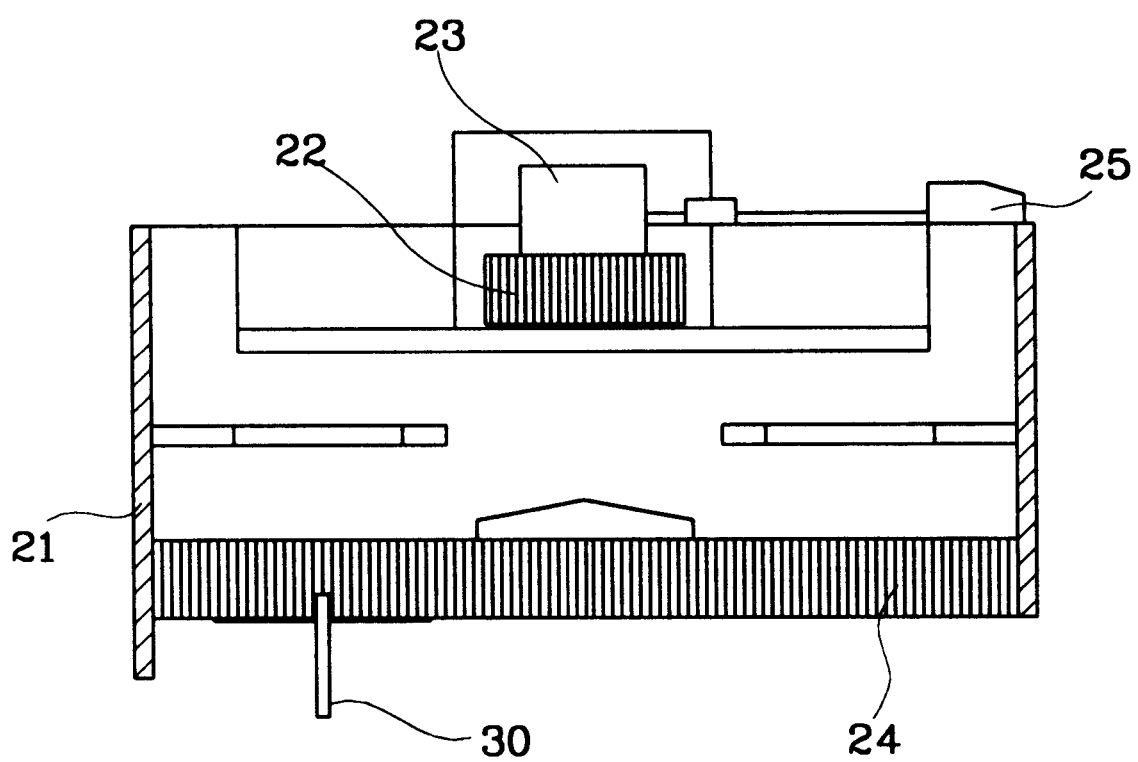
FIG. 3 is a sectional view of a fan filter unit having a monitoring device in accordance with the present invention.

As shown in FIG. 3, a blower 22 and motor 23 are installed inside a housing 21, and a filter 24 is installed at a lower part of the housing 21 to eliminate contaminants, such as dust, from the air flow created by blower 22. The motor 23 is controlled by a local control unit 25 which is an exclusive controller containing a microprocessor. Charge induction sensor 30, which is installed on the bottom of filter 24, switches between a drive stopped position, which can be identified with the naked eye, and a normal drive position, which can not be discriminated from the filter with the naked eye, according to the direction in which the air stream flows through filter 24.

Figure 4:
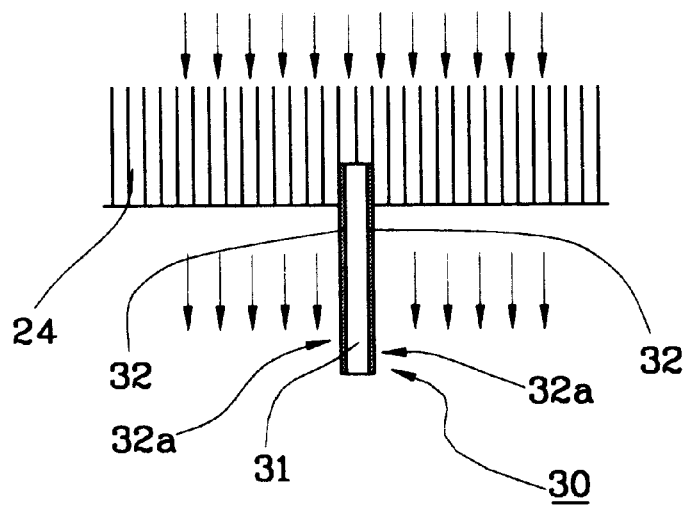
FIG. 4 and FIG. 5 are enlarged views of portions of a fan filter unit monitoring device in accordance with the present invention, showing the operation thereof.
Figure 5:
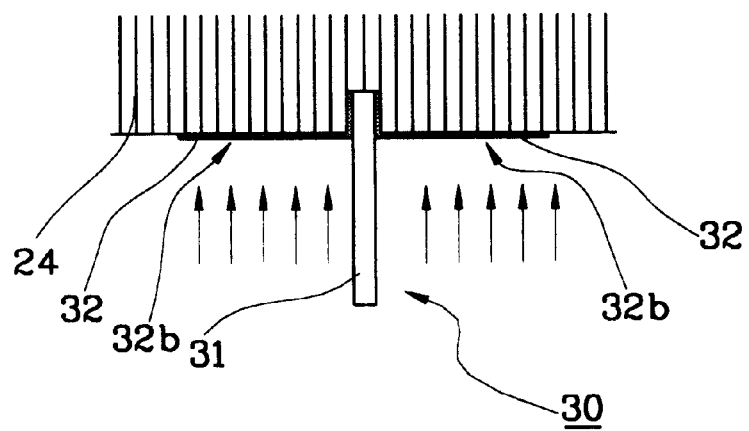

As shown in FIG. 4 and FIG. 5, the charge induction sensor 30 consists of a vertical plate 31 whose upper part is attached to filter 24, and a flag 32 which is attached to both sides of the top portion of vertical plate 31. Vertical plate 31 is made of glass which becomes positively charged, and flag 32 is made of polypropylene which becomes negatively charged. Flag 32 thus sticks to the filter 24 or to the vertical plate 31 while attached at one end to both sides of the top of the vertical plate. Its other end is free to move under the flow of air and the force of attraction due to static charges produced in the housing 21.

When in a normal drive position, the flag 32 sticks to the vertical plate 31 (FIG. 4), exposing its outer surface 32a. On the other hand, when the flag is in a drive stopped position (FIG. 5), it sticks to filter 24, thereby exposing its inner surface 32b. The outer surface 32a of the flag 32 has a color different from that of the inner surface 32b so that the normal operating position can be easily discriminated from the stopped position. The color of the outer surface 32a of the flag 32, indicative of a normal operating condition, is preferably the same as that of the bottom of the filter 24, thus preventing one from being able to visually discriminate between the flag 32 and filter 24 when the flag 32 sticks to the vertical plate 31. The color of the inner surface 32b of the flag 32, indicative of the stopped position, is preferably one that can be easily and visually discriminated from the filter 24 and can be a warning color such as red that can be easily detected. Additionally, the surfaces of vertical plate 31 are finished to function as mirrors capable of reflecting light, thus increasing the area observable with the naked eye by reflecting an image of the inner surface 32b of flag 32 when it sticks to filter 24 indicating the stopped condition.

As shown in FIG. 3 and FIG. 4, once the drive motor 23 of the fan filter unit starts, the air flows downward and passes through filter 24. The air passing through filter 24 blows the flag 32 downward so that the free end of flag 32 moves downward by 90° from the bottom of the filter. Since the flag 32 is made of polypropylene which becomes negatively charged, static electricity is generated on the surface of the flag by friction with the air flowing thereacross, and causes the flag 32 to stick to the vertical plate 31 which is made of glass which becomes positively charged. This position of the flag 32 indicates a normal operating condition. Since the vertical plate 31 is screened by the flag 32, and the color of the outer surface 32a of the flag 32 is the same as the color of the filter 24, the flag 32 can not be especially discriminated from the filter 24. Consequently, an operator can tell that the fan filter unit is operating normally.

Referring now to FIG. 5, because the air pressure at the top of the fan filter unit outside the clean room is lower than the air pressure inside the clean room, when the motor 23 of the fan filter unit stops (due to a malfunction or to its service life coming to an end), the air flows in an upward direction through the fan filter unit, passing through the filter 24. As air passes through the filter 24 made of commercially available glass fibers, its ions become unbalanced; the concentration of negative ions becomes 65 to 75%, the concentration of positive ions about 10%, and the concentration of neutral ions about 15 to 25%. Negative charges thus exist in the upper part of the filter 24. The static electricity separates the free end of the flag 32 from the vertical plate 31, and the flag 32 is stuck to the bottom of the filter 24 by the upwardly flowing air stream.

The inner surface 32b of the flag 32 thus exposes a discriminating color, for example red, so that the operator can easily tell that the fan filter unit has stopped. Additionally, since both sides of the vertical plate 31 are reflective, the area which is easily identifiable by the naked eye is rather large. Thus, an operator can easily determinate the operating state of the fan filter unit.

Because the fan filter unit for use in clean rooms in accordance with the present invention enables an operator to determine its operating state with the naked eye, the operator can intervene at an early stage of a malfunction. Consequently, the clean room can be maintained at a high purity state, whereby defects caused by the contamination of the clean room can be held to a minimum and the yield of products can be maximized.

It will be apparent to those skilled in the art that various modifications can be made in the fan filter unit of the present invention without departing from the spirit or scope of the invention. Thus, all such modifications and variations that come within the scope of the appended claims are seen to be within the true spirit and scope of the present invention.

What is claimed is:

1. A fan filter unit comprising:
   a blower;
   a filter;
   a motor operatively connected to the blower for driving the same to force a stream of air through the filter; and
   a monitoring device including a flag having an inner surface and an outer surface, said inner surface and said outer surface having different visual characteristics from one another, said flag being attached in the unit at the bottom of the filter so as to be movable between a normal drive position at which the flag hangs vertically under the flow of the air stream presenting the outer surface and a drive stopped position at which the flag lies against the bottom of the filter presenting the inner surface, said inner surface being readily discriminated from the bottom of the filter with the naked eye using the visual characteristics.

2. The fan filter unit as claimed in claim 1, wherein said monitoring device is a charge induction sensor which further includes a plate of material which becomes positively charged by friction when the air stream passes thereover, said plate extending vertically from the bottom of the filter so as to be in the path of an air stream forced through the filter by the blower, and wherein said flag is of a material which becomes negatively charged by friction when the air stream passes thereover, said flag being attached only at one end thereof to a top end portion of said plate so that it sticks to the plate when in said normal drive position and sticks to the filter when in the drive stopped position.

3. The fan filter unit as claimed in claim 2, wherein the materials of the plate and flag are glass and polypropylene, respectively.

4. The fan filter unit as claimed in claim 2, wherein said outer surface is the same color as that of the bottom of the filter, the outer surface being exposed while the flag is stuck to said plate in the normal position, and said inner surface is of a color that is distinct from the color of the bottom of the filter.

5. The fan filter unit as claimed in claim 3, wherein said outer surface is the same color as that of the bottom of the filter, the outer surface being exposed while the flag is stuck to said plate in the normal position, and said inner surface is of a color that is distinct from the color of the bottom of the filter.

6. The fan filter unit as claimed in claim 2, wherein said plate has a mirror finish so as to be reflective, whereby when said flag is in the drive stopped position thereof, said plate will reflect the image of said first side of the flag.

7. The fan filter unit as claimed in claim 3, wherein said plate has a mirror finish so as to be reflective, whereby when said flag is in the drive stopped position thereof, said plate will reflect the image of said first side of the flag.

8. The fan filter unit as claimed in claim 4, wherein said plate has a mirror finish so as to be reflective, whereby when said flag is in the drive stopped position thereof, said plate will reflect the image of said first side of the flag.

9. The fan filter unit as claimed in 5, wherein said plate has a mirror finish so as to be reflective, whereby when said flag is in the drive stopped position thereof, said plate will reflect the image of said first side of the flag.

10. The fan filter unit as claimed in claim 2, wherein said plate has two opposite sides, and said flag covers both of said two opposite sides of the plate when in said normal position thereof.

11. The fan filter unit as claimed in claim 10, wherein the materials of the plate and flag are glass and polypropylene, respectively.

12. The fan filter unit as claimed in claim 11, wherein said outer surface is the same color as that of the bottom of the filter, the outer surface being exposed at both sides of said plate while the flag is stuck to said plate in the normal position, and said an inner surface is of a color that is distinct from the color of the bottom of the filter, the inner surface covering both sides of said plate while the flag is stuck to said plate in the normal position and being exposed when the flag is stuck to said filter in the drive stopped position.

13. The device according to claim 12, wherein said plate has a mirror finish at both sides thereof so as to be reflective, whereby when said flag is in the drive stopped position thereof, said plate will reflect the image of said first side of the flag.

* * * * *